Freeman & Ford.
Track-Cleaner.
N° 74,811. Patented Feb. 25, 1868.
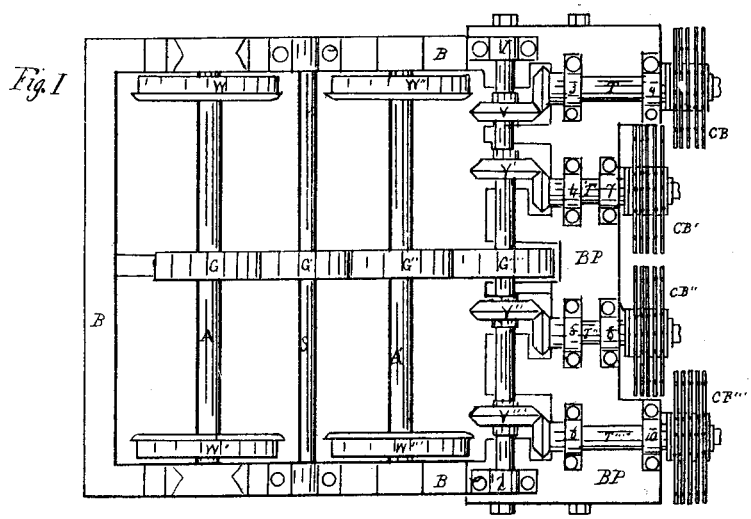
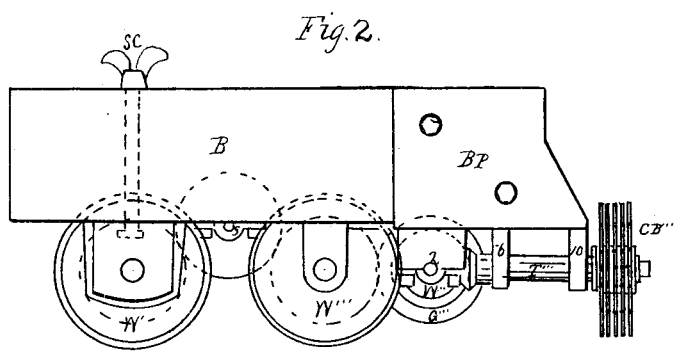
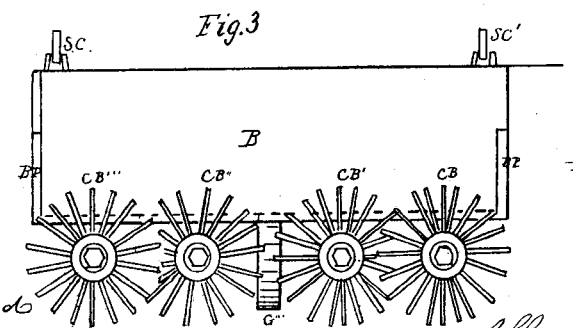
Witnesses
Isaac R. Oakford
Charles H. Evans
Inventors
Albert A. Freeman
Samuel Ford

United States Patent Office.

ALBERT A. FREEMAN AND SAMUEL FORD, OF PHILADELPHIA, PENNSYLVANIA.

Letters Patent No. 74,811, dated February 25, 1868.

IMPROVED TRACK-CLEANER.

*The Schedule referred to in these Letters Patent and making part of the same.*

TO ALL WHOM IT MAY CONCERN:

Be it known that we, ALBERT A. FREEMAN and SAMUEL FORD, of the city and county of Philadelphia, State of Pennsylvania, have jointly invented a new and useful Improvement in "Track-Cleaners;" and we do hereby declare that the following is a full, clear, and exact description of the construction and operation of the same, reference being had to the accompanying drawings, and to the letters of reference marked thereon, making a part of this specification, in which—

Figure 1 is a bottom plan of our track-cleaner.

Figure 2 is a side view of same.

Figure 3 is an end view of same.

The object of our joint invention is to provide a truck so arranged, as hereinafter described, that we are enabled at all times to clear city passenger-railroad tracks of all obstructions, such as snow, mud, ice, &c., &c., and also, by its peculiar arrangement, we are enabled to distribute the snow from gutter to gutter, and prevent banking, which has become, of late, so great an inconvenience after every snow-storm, by the present process used for removing the snow from the track.

To enable others skilled in the art to make and use our invention, we will now proceed to describe its construction and operation.

We make the axles A and A', and wheels W, W', W", and W''', of the ordinary size and material used in the construction of trucks and cars for city passenger-roads. On axles A and A' is mounted the body, B, made of wood, and of any length and width to suit. On the bottom, and at the rear end of the truck, is placed a cast-iron bed-plate, B P, which extends a short distance under the bottom, and projects a few inches in the rear, and made with sides corresponding with the height of the body B, through which bolts pass, securing it in place. On the under side of the bed-plate B P, and either cast or bolted to it, are bearings, 1 and 2, placed on a line with the side of the body, B. On a line with the rear end of the truck are placed bearings 3, 4, 5, 6, 7, and 8, and at the extreme edge of the bed-plate, bearings 9 and 10, all secured in the same manner as bearings 1 and 2. Between the axles A and A' is placed a shaft, S, having its bearings fixed on the side of the body, B. Running in bearings 1 and 2 is a shaft, S'. Keyed on the centre of axles A and A' and shafts S and S' are geared wheels G, G', G", and G'''. On the shaft S' are four bevelled geared wheels, V, V', V", and V''', which gear into wheels on shafts T, T', T", and T''', said shafts running in bearings 3, 4, 5, 6, 7, 8, 9, and 10. On the end of shafts T, T', T", and T''', which project over bed-plate B P, are placed circular brooms, C B, C B', C B", and C B'''. Said brooms are made of rattan or any other suitable material, and in lengths to suit, and are secured in place by gum washers or any other suitable material, passing over the shafts, and the whole is secured by means of iron washers and nuts. On the front end, and on top of the body B, are placed screws S C and S C', (figs. 2 and 3,) and connected with the bearings in which axle A runs, for the purpose of elevating this end of the truck and lowering the rear end, thus securing the proper dip to brooms C B, C B', C B", and C B''', in order to sweep out the tram-way of the rails, as the brooms wear away. The bearings of the shaft S are placed above the centre of the axles A and A', for the purpose of keeping the wheels G and G' in gear when the front end of the truck is elevated. Shaft 3 can also be arranged to work in a box bolted on the inside of the body B, and not to run all the way across, as shown in the drawings.

In operating our track-cleaner, it often becomes necessary to turn the truck end for end, or transfer it from track to track. In this case we apply a screw-jack, placed under the body of the truck so as to evenly balance it. We now elevate the truck by a few turns of the screw, and swing it around in the desired position. On roads where there is a double track, t becomes necessary to have the brooms geared to work all in the same direction, so as not to throw the snow or other obstructions off from one track on to the other. In this case we place the brooms C B, C B', C B", and C B''' in an oblique position. In order to prevent splashing of snow, mud, or water by the brooms, on passing vehicles or on the sidewalks, we place an India-rubber, oiled cloth, or light iron fender over the top, and partially on the sides of the brooms, and at a proper distance, so as not to interfere with the proper working of the same.

Having thus described our invention, its construction and operation, what we claim as new, and desire to secure by Letters Patent of the United States, is—

1. Bed-plate B P, bearings 1, 2, 3, 4, 5, 6, 7, 8, 9, and 10, shafts T, T', T'', and T''', brooms C B, C B', C B'', and C B''', shafts S and S', bevelled wheels V, V', V'', and V''', geared wheels G, G', G'', and G''', all constructed, combined, and operating in the manner and for the purpose above set forth and described.

2. The combination and arrangement of the screws S C and S C' with the car-frame, so as to give the proper dip to brooms C B, C B', C B'', and C B''', as above set forth and described.

3. A track-cleaner, composed of the above-described parts, constructed, arranged, and operating in the manner and for the purpose above set forth and described.

ALBERT A. FREEMAN.
SAMUEL FORD.

Witnesses:
CHARLES H. EVANS,
ISAAC R. OAKFORD.